(12) United States Patent
Enenkl et al.

(10) Patent No.: US 9,114,875 B2
(45) Date of Patent: Aug. 25, 2015

(54) LEAD LAG DAMPER FOR HELICOPTER ROTOR UNIT

(75) Inventors: Bernard Enenkl, Bockhorn (DE); Rupert Pfaller, Riemerling (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 474 days.

(21) Appl. No.: 13/562,405

(22) Filed: Jul. 31, 2012

(65) Prior Publication Data

US 2013/0034442 A1  Feb. 7, 2013

(30) Foreign Application Priority Data

Aug. 4, 2011  (EP) ..................................... 11400041

(51) Int. Cl.
  *B64C 27/51*  (2006.01)
(52) U.S. Cl.
  CPC ....................................... *B64C 27/51* (2013.01)
(58) Field of Classification Search
  CPC ................................. B64C 27/35; B64C 27/51
  USPC ......................................... 416/106, 107, 500
  See application file for complete search history.

(56) References Cited

U.S. PATENT DOCUMENTS

| | | | |
|---|---|---|---|
| 4,268,222 A * | 5/1981 | Bernard | ............................. 416/1 |
| 4,297,078 A | 10/1981 | Martin | |
| 5,141,398 A | 8/1992 | Bietenhader | |
| 5,372,478 A | 12/1994 | McCafferty | |
| 8,764,396 B2 * | 7/2014 | Stamps et al. | ................ 416/107 |
| 2007/0071602 A1 | 3/2007 | Beroul | |
| 2011/0243734 A1 | 10/2011 | Schmaling | |

FOREIGN PATENT DOCUMENTS

| | | |
|---|---|---|
| EP | 0424267 A1 | 4/1991 |
| WO | 2010068194 A1 | 6/2010 |

OTHER PUBLICATIONS

Search Report and Written Opinion; Application No. EP 11400041; dated Jan. 10, 2012.

* cited by examiner

*Primary Examiner* — Liam McDowell
(74) *Attorney, Agent, or Firm* — Brooks Kushman P.C.

(57) ABSTRACT

A lead lag damper (10, 11) for a helicopter rotor unit has a rotor and a hub (8), said rotor having N rotor modes, with N being the number of blades. This centered single lead lag damper (10, 11) for the entire rotor unit has an essentially cylindrical shape, with an elastomer material shear element between a first side (7) and a second side (9) having a homogenous resistance to shear deformation and being axially preloaded, so that the lead lag damper (10, 11) acts in a homogenous manner in the rotor inplane eigenmodes. Thus, the lead lag damper (10, 11) acts as a single unit on the critical inplane mode of the rotor, which is having N identical blades (1-4). The elastomeric material is loaded by a uniform shear deformation in contrary to the commonly used oscillatory deformation.

20 Claims, 1 Drawing Sheet

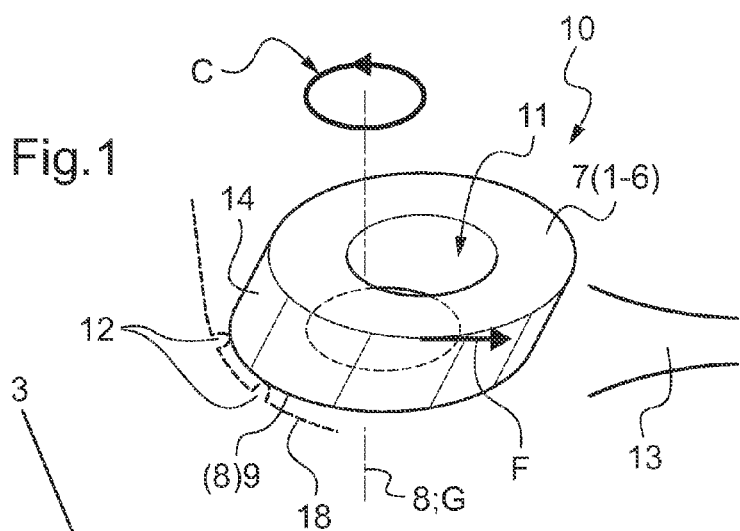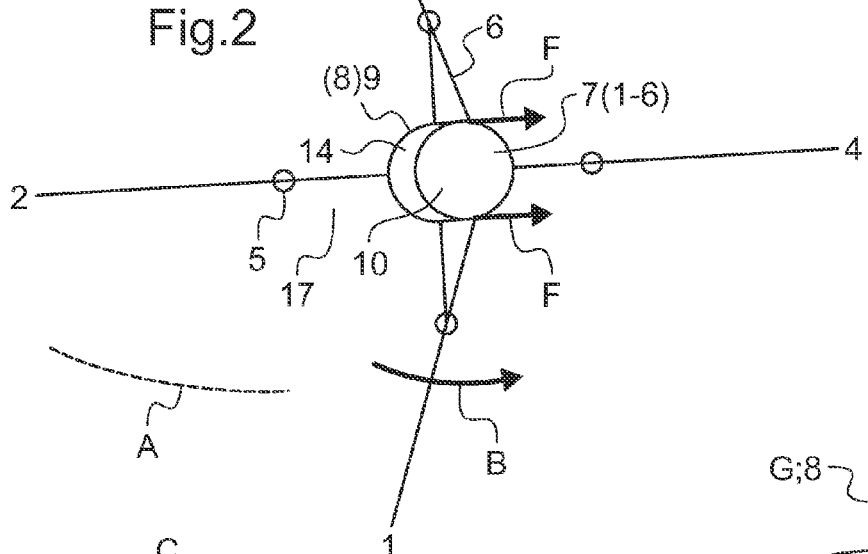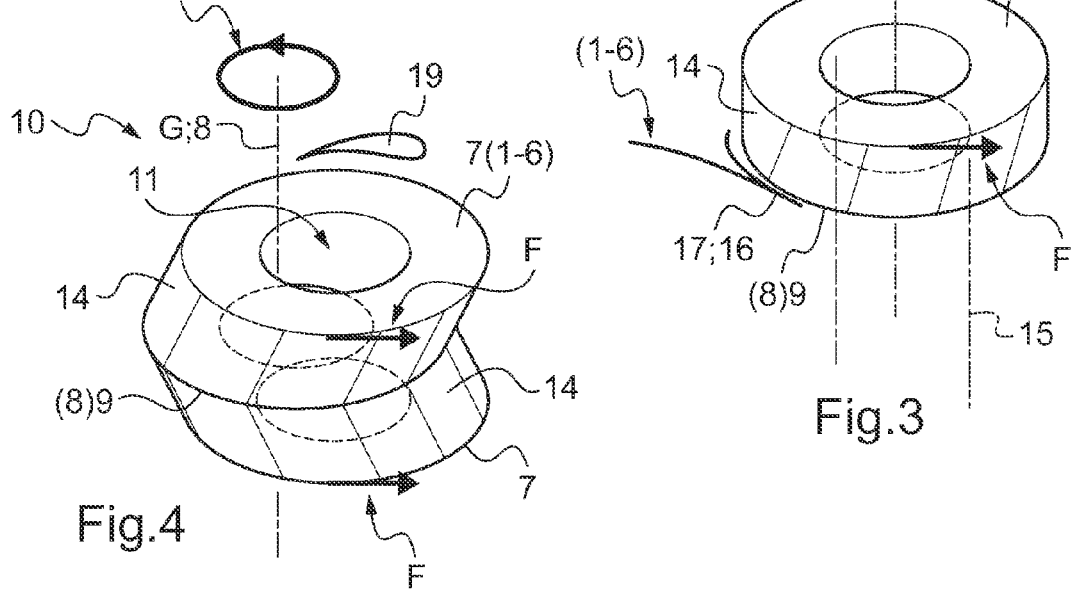

LEAD LAG DAMPER FOR HELICOPTER ROTOR UNIT

CROSS-REFERENCE TO RELATED APPLICATIONS

This application claims priority to EP11400041.7 filed on Aug. 4, 2011, the disclosure of which is incorporated in its entirety by reference herein.

BACKGROUND OF THE INVENTION (1) Field of the Invention

The invention relates to a lead lag damper for a main rotor unit of a rotary wing aircraft, e.g. a helicopter, with a rotor and a hub.

(2) Description of Related Art

Each degree of freedom of a rotor can be described by N rotor modes, with N being the number of blades of said rotor. There are cyclic modes (longitudinal and lateral), collective modes and differential modes.

The critical regressive rotor inplane mode is a non-harmonic cyclic mode. Rotary wing aircrafts main rotors feature a lead lag damping device acting on said inplane motion of the rotor blades by transforming shear deformation in the lead lag damping device into heat. Said lead lag damping is necessary for preventing aeromechanical instabilities of the helicopter, so called ground and air resonance caused by an interaction between modes of the fuselage and the regressive rotor inplane mode composed by the lead-lag oscillation of the individual rotor blades as a consequence of a circular rotating displacement of the centre of rotating rotor blades relative to the hub of a helicopter. The design and lay-out of a lead lag damping device depend on the applied rotor concept.

The document U.S. Pat. No. 5,372,478 describes a rotorcraft rotor with blades hinged in flap and lag. A common lag damper system is centered on an axis of rotation of the rotor. A squared shaped damper comprises planar strips with rigid plates superposed along the rotor axis, with elastomer layers. Strips and layers are resiliently interconnected. Each rigid plate of this central common lag damper system is connected only to one distinct blade root, via a dedicated ball joint.

The document U.S. Pat. No. 4,297,078 discloses a helicopter rotor with a rotor head, arranged to support a plurality of rotor blades for rotation about an axis. The rotor head comprises a generally hollow structure. Each rotor blade is supported by an elastomeric bearing arranged to permit blade flap, lead/lag and feathering movements. The support means comprises interconnected inner and outer elastomeric assemblies, the outer assembly being connected to each rotor blade through a common elastomeric lead/lag damper unit which provides inter-blade damping of blade lead/lag movements. The elastomeric assemblies are pre-compressed.

The document EP0424267 describes drag elastic-return damping devices for rotorcraft rotor blades. Such a device comprise a member for elastic return with incorporated damping, of the rotary type and whose functioning is ensured by circumferential shearing of a viscoelastic material highly stable to distortions, such as an elastomer. This ensures an elastic return of the blades to a neutral position in drag. A connecting rod drives, by way of a rotational joint, a lever and an outer armature of the corresponding member in rotation about an inner armature. This inner armature is retained in a fixed position relative to the hub. Flanges are fixed to the inner armature, onto a zone of the periphery of the hub, between two adjacent blades.

The document WO2010068194 describes a rotor system with a lead stop mounted to a spindle and a lead stop plate mounted to a rotor hub arm, this stop being operable to contact the lead stop plate. The rotor hub has a plurality of rigid hub arms.

The document US2007071602 discloses a rotorcraft rotor comprising a hub and at least two blades hinged by respective joints relative to the hub about respective pitch axes and about respective flap axes and about respective lag axes. Each blade is secured to a respective pitch lever. The rotor includes a respective pitch control rod connected to each pitch lever by a first ball joint and a common lag damper system centred substantially on the axis of rotation of the rotor. Connected to each of the blades; the damper system is secured to a respective lateral projection from each blade via a respective second ball joint that is sufficiently close to the first ball joint connecting the pitch rod to the pitch lever for the lag damper system to be relatively insensitive to flap oscillations of the hinged blades. The damper when seen from above is a square frame; each "side" of the frame forms a respective damper unit, these four identical damper units being connected together in pairs.

Said existing concepts for lead-lag dampers of the quoted state of the art have in common that each blade of the rotor has a hinge and an individual elastomeric damping device associated. The elastomeric material of said dampers undergoes a linear shear deformation due to the applied circular rotating displacement. The inplane motion of each of the blades of a rotor has to be taken into account said inplane motion comprising n/rev (n=0, 1, 2, 3 . . . –rev=revolution) and non-harmonic displacements. Said non-harmonic displacements are from the inplane eigenmodes of the blades of a rotor. Said inplane eigenmodes are superposed with said n/rev displacements. The coupling of said circular, non-harmonic rotating displacement with an airframe mode can yield the phenomenon of ground resonance, if the embedded damping is not sufficient.

BRIEF SUMMARY OF THE INVENTION

It is an objective of the invention to provide a lead lag damper for a main rotor unit with improved damping and simple structure.

The solution is provided with a centered lead lag damper for a main rotor unit with an essentially cylindrical shape. A second side of the lead lag damper is opposed to a first side in an axial direction (G) of the hub, with an elastomer material between the first side and the second side being a shear element resistant to shear deformation. The lead lag damper is a spring/damping system which is axially preloaded, so that the lead lag damper acts in a homogenous manner the rotor inplane eigenmodes.

According to an embodiment of the invention a lead lag damper for a main rotor unit in a rotary wing aircraft, with a rotor and a hub is provided. Said damper is adapted to be coaxially supported with a first of its sides on the hub. At a second of its sides said damper is provided with linking means to link said second side to said rotor or at least one of N identical blades (N=3, 4, 5, 6 or more) of said rotor. The inventive lead lag damper has an essentially cylindrical shape. The second side of the damper is opposed to the first side and elastomer material between said first and second sides is resistant to shear deformation.

The invention proposes a mechanical damper, which acts directly on to the relevant rotor mode for which the damping is essential, namely the regressive rotor lead-lag mode. Therefore the invention improves the specific efficiency. The single and centred damper for the entire rotor ensures that each rotor blade "sees" the same stiffness of the damper. Therefore potential imbalances of the rotor are avoided. Said imbalances may be caused by a scattering of individual damper properties (manufacturing, aging . . . ).

The respective linear oscillating shear motions of the lead lag dampers of the state of the art are replaced by a steady circular shear motion of the inventive lead lag dampers allowing to load the elastomer material of said inventive lead lag dampers in a homogenous and therefore optimal manner in order to deal with the rotor inplane eigenmodes as necessary for ground resonance prevention. The homogenous loading of the inventive lead lag dampers allows lower specific shear stiffness of the elastomeric material and therefore a more beneficial relationship between axial stiffness and shear stiffness with the consequence of an option for easier matching of damper and blades lead-lag kinematics properties.

The inventive lead lag damper works purely in the rotor plane (inplane) and is not pitched with one of the N blades. Therefore no degradation of the efficiency is possible and lead-lag/pitch coupling effects depend no longer of any blade pitch position. The inventive lead lag damper allows a reduced influence of the shear stress amplitude on the damper stiffness, which reduces the risk of unintended small limit cycle oscillations of the helicopter. The steady circular shear motion of the inventive lead lag dampers allows time independent dissipation of mechanical work under steady operating conditions of the helicopter.

One single inventive lead lag damper per rotor unit has less weight, is less bulky and reduces parts compared to the plurality of lead lag dampers per rotor unit of the state of the art. According to test results the inventive lead lag damper provides reduced specific stiffness, i.e., less volume is needed per unit of stiffness and as a further advantage the damping characteristics avoid nonlinearities, i.e., the improved damping characteristics do not depend from the displacements as much as is known from elastomeric dampers of the prior art. The inventive lead lag damper allows a fully integrated arrangement into the rotor unit with a potential of hub drag reduction. Space for clearance for the inventive lead lag damper between the hub and the rotor unit or the N blades is only necessary for the cyclic modes. The contribution of the collective modes does not need additional space. The design of the rotor unit can be more compact and the centred principle of the inventive lead lag damper is applicable with most rotor hub concepts.

According to a preferred embodiment of the invention, the lead lag damper has an essentially annular shape for improved adaption to the hub of the rotor unit.

According to a further embodiment of the invention the rotor comprises a rotor star with a central space and the lead lag damper is located in said central space of said rotor star for reduced drag.

According to another embodiment the first side of the lead lag damper is clamped to the hub and the second side is linked to at least one control cuff of at least one blade.

According to an embodiment of the invention the elastomer is bonded to metal or fibre parts of the first side and/or the second side.

According to a further embodiment the lead lag damper is a spring/damping system.

According to an embodiment of the invention the lead lag damper is axially preloaded. The axial pre-loading of the damper, for preventing tension in the elastomeric material, has not to be counteracted by the blade cuff and hence saves space and mass. The pressure caused by the required preloading can be chosen lower because the peak loading on the elastomer is reduced.

According to a further embodiment of the invention more than one shear element is applied to the hub, which simplifies for example the axial pre-loading.

According to another embodiment of the invention the shear elements are separated in axial direction on the hub.

According to an embodiment of the invention the interfaces to the hub, the rotor and/or the blades are exchangeable.

According to a further embodiment of the invention stops are provided within the space at the center of the rotor. In case of space limitation for the free movement within the space at the center of the rotor of opposed sides of the lead lag damper relative to each other the contact to the stop is smoothly and not oscillating as would be the case with a linear damper of the state of the art. By designing e.g. appropriate hard stops, non-linear shear stiffness characteristics of the inventive lead lag damper can be created.

According to an embodiment of the invention the linking means are rods and levers to connect said second side of the lead lag damper to the blades of the rotor in case the lead lag damper is located outside an open space at the center of the rotor, on top or below of the rotor plane. Said arrangement of the lead lag damper outside the open space at the center is advantageous if no or not enough space is available at the center of the rotor.

According to a further embodiment of the invention a non-rotating shaft is provided coaxially around said hub, said first side of the lead lag damper being clamped via said non-rotating shaft to the hub and the second side being linked to said at least one control cuff of the at least one blade via a rotating bearing. An advantage of this embodiment of the invention is that the critical regressive rotor inplane eigenmode causes a circular motion of the inventive not rotating lead lag damper with a frequency, which is the difference between the rotor frequency and the natural inplane blade frequency. The 1/rev inplane displacements degenerate to a steady displacement of the inventive, not rotating, lead lag damper. Thus the number of the fatigue load cycles of the elastomeric material is reduced significantly. The deviating static and dynamic shear stiffness characteristics of the elastomeric material can be used as a design parameter for the rotor lead-lag dynamics. The inventive not rotating lead lag damper is loaded dynamically only when the natural cyclic inplane eigenmode is excited, e.g. after disturbances of steady flight conditions such as gusts, manoeuvring or in the case of the coupling with airframe modes on ground, namely ground resonance.

According to an embodiment at least one shear element of the inventive not rotating lead lag damper is clamped with its first side via said non-rotating shaft to the hub and with its second side to said at least one control cuff of the at least one blade via a rotating bearing while at least one further shear element of the inventive rotating lead lag damper is clamped with its respective first side to the hub and with its respective second side to the at least one rotor blade thus combining the respective advantages of the inventive not rotating lead lag damper with the respective advantages of the inventive rotating lead lag damper.

BRIEF DESCRIPTION OF THE SEVERAL VIEWS OF THE DRAWINGS

Embodiments of the invention are presented in the following description with reference to the attached drawings.

FIG. 1 shows a schematic view of a lead lag damper according to the invention,

FIG. 2 shows a schematic top view of the lead lag damper integrated into a 4-bladed rotor unit (N=4) according to the invention, FIG. 3 shows another schematic view of the lead lag damper according to the invention, and FIG. 4 shows a schematic view of an embodiment of a double lead lag damper according to the invention.

DETAILED DESCRIPTION OF THE INVENTION

According to FIGS. 1 and 2, a lead lag damper 10 is a spring/damping system is clamped concentric with a first side 9 to a hub 8 of a main rotor unit. A second side 7 of the lead lag damper 10 is having linking means 17 e.g. rods and/or levers (FIG. 2) to a respective control cuff 6 for each of the N blades 1-4 (in this example, N=4) of an essentially concentric rotor of a rotary wing aircraft e.g. a helicopter (A, see FIG. 2). Each of the N blades 1-4 is provided with a lead-lag hinge 5. Blade 3 is ahead and blade 1 is behind the rotation (B, see FIG. 2) of the rotor unit representing a cyclic inplane eigenmode (C, see FIG. 1) of the rotor. The main rotor unit comprises the N blades 1-4 as well as the lead lag hinges 5, the control cuffs 6, and is referred to by reference (1-6) on FIGS. 1-4.

From FIG. 1, in operation of the rotary wing aircraft A, a first side 9 of the lead lag damper 10 is moved relatively to a second side 7 within an open space 18 inside the center of the rotor.

On FIG. 1, space limitations within said open space 18 in the center of the rotor unit are provided by stops 12, for restricting said movement between said second side 7 and first side 9 which are opposed one another in an axial direction G (FIGS. 1, 3-4) of the lead lag damper 10. The stops 12 are implemented as hard stops or by stops with defined stiffness, allowing the design of non-linear damper stiffness characteristics for said stops 12 with defined stiffness. The stops 12 are mounted to the inside circumference of said open space 18 in the center of the rotor.

On FIG. 1, the second side 7 of the lead lag damper 10 is linked to a rotor star 13 such as a planar flexbeam unit as an interface between the hub 8 and a plurality of rotor blades (1-4). Said rotor star 13 forms a planar flex beam unit made of composite compound, with an odd number of essentially planar torque arms. Each torque arm has essentially a concave profile on either side along its radial extension and being integral with its adjacent torque arms at a root area of said torque arm with a relatively big width. Said rotor star 13 is provided with an essentially circular opening, e.g. forming the open space 18, at its center to encompass the lead lag damper 10.

The lead lag damper 10 is preloaded coaxially to the hub 8. The lead lag damper 10 has an annular shape and is filled with elastomer between the first and second sides 9, 7. The first and second sides 9, 7 are made with metal parts and/or fibre parts. The elastomer is bonded to the first and second sides 9, 7, thus forming elastomer shear elements 14.

The cyclic lead-lag motion of the rotating blades 1-4 introduces forces (F, see FIGS. 1-4) which move the lead lag damper 10 in a circular manner (i.e. the cyclic inplane Eigenmodes C) and cause a circular shear deformation in the elastomeric shear elements 14 between the first and second sides 9, 7 of the lead lag damper 10.

FIG. 1 shows—as a sample—the time variant forces F resulting from the cyclic lead-lag motion of one of the blades 1-4. The resulting circular motion (cyclic inplane Eigenmodes C) around the hub 8 provokes corresponding circular shear deformation of the lead lag damper 10.

FIG. 2 shows—as a sample—a cyclic inplane rotor Eigenmode and how the lead lag damper 10 is moved due to the forces of the N blades 1-4. The sum of the forces F of all N blades 1-4, in the shown position results in one displacement of the lead lag damper 10 versus azimuth. Said displacement represents one instant of the circular motion of the lead lag damper 10 due to the rotation of the blades 1-4 in steady flight conditions of the rotary wing aircraft or rotorcraft A.

The effective stiffness of the elastomer shear elements 14 of the lead lag damper 10 is tuned according to the rotor modes, which can be used as a design parameter. The cyclic mode stiffness is due to the circular motion.

According to FIG. 3 the same references are used for corresponding features in FIGS. 1-2. FIG. 3 shows—as a sample—the time variant forces of a collective inplane mode of a blade cuff of one of the blades 1-4 and the resulting torsional motion around the hub 8 resulting in an oscillating circular shear deformation of the lead lag damper 10. The collective modes are time synchronous motions of all blades of a rotor without impact for the aeromechanical stability of the rotorcraft A. The collective stiffness is due to the torque motion and the differential stiffness is significantly higher because the elastomer material is bridged.

According to FIG. 4 the same references are used for corresponding features in FIGS. 1-3. Two preloaded elastomer shear elements 14 are applied coaxially along axial direction G to the hub 8, so as to form one double lead lag damper 10. Each shear element 14 corresponds to one lead lag damper 10 as per FIGS. 1-3, with the respective second sides 9 of each elastomer shear element 14 contacting each other.

Interfaces 19 of the lead lag damper 10 are shown on FIG. 4. The interfaces 19 link the lead lag damper 10 to the hub 8 and to the blades 1-4. These interfaces 19 are such as rods and/or levers can be exchanged between the first and second sides 9, 7.

On FIGS. 1 and 3-4, a central space 11 is provided inside the lead lag damper 10, coaxially to the axial direction G.

On FIG. 3, the lead lag damper 10 is clamped to a non-rotating shaft 15 of the rotor unit. The non-rotating shaft 15 is coaxially located around the rotating shaft of the hub 8. The lead lag damper 10 is clamped at its first side 7 to this non-rotating shaft 15 and the second side 9 is linked to at least one control cuff (6) of the at least one blade 1-4, via a bearing ring 16. The bearing ring 16 is a linking means 17 and is coaxially located around the non-rotating shaft 15. This whole lead lag damper 10 with a non-rotating shaft 15 is not rotating.

An embodiment proposes a lead lag damper (10,11) wherein the second side 7 of this damper is linked to each of the N blades (e.g. 1-4) of the rotor unit and the first side 9 is at least translationally fixed in the rotor plane.

In another example, the lead lag damper (10,11) has the second side 7 linked to each of the N blades (e.g. 1-4) and the first side 9 which is translational in the rotor plane fixed and rotationally fixed.

In a further example, the lead lag damper (10,11) has the first side 9 linked to each of the N blades (e.g. 1-4) and the second side 7 at least translationally fixed in the rotor plane.

An example comprises a lead lag damper (10,11) wherein the first side 9 is linked to each of the N blades (e.g. 1-4) and the second side 7 is translational in the rotor plane fixed and rotational fixed.

As required, detailed embodiments of the present invention are disclosed herein; however, it is to be understood that the disclosed embodiments are merely exemplary of the invention that may be embodied in various and alternative forms.

The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A lead lag damper for a rotor unit of a rotary wing aircraft, the rotor unit having a rotor and a hub, the damper comprising:
    a first side configured to couple to the hub with a central axis of the first side being generally coaxial with a central axis of the hub;
    a second side spaced from the first side and being opposed to the first side;
    linking means at the second side to link the second side to a plurality of blades of the rotor; and
    an essentially cylindrical damper body extending between the first side and the second side and comprising an elastomer material, the lead lag damper being a spring/damping system which is axially preloaded, so that the lead lag damper acts in a homogenous manner in inplane eigenmodes of the rotor.

2. The lead lag damper according to claim 1, wherein the lead lag damper has an essentially annular shape, with a central space at the center of the lead lag damper.

3. The lead lag damper according to claim 1, wherein the rotor unit comprises an open space at the center of the rotor unit and the damper is located centrally in the open space of the rotor unit.

4. The lead lag damper according to claim 3, wherein the rotor unit comprises a rotor star with the open space and the lead lag damper is located in the central space of the rotor star.

5. The lead lag damper according to claim 3, wherein stops are provided within the open space in the center of the rotor unit, the stops being hard stops and/or stops with defined stiffness.

6. The lead lag damper according to claim 3, wherein the linking means have rods and levers to connect the second side of the lead lag damper located outside the open space at the center of the rotor unit, on top of or below a rotor plane of the blades.

7. The lead lag damper according to claim 1, wherein the first side of the lead lag damper is clamped to the hub and the second side is linked to at least one control cuff of at least one blade.

8. The lead lag damper according to claim 7, wherein a non-rotating shaft is provided coaxially around the hub, the first side being clamped via the non-rotating shaft to the hub and the second side is linked to the at least one control cuff of the at least one blade via linking means comprising a rotating bearing.

9. The lead lag damper according to claim 1, wherein the damper body is bonded to metal parts and/or fiber parts of the first side and/or of the second side.

10. The lead lag damper according to claim 1, wherein the damper body comprises a plurality of elastomer shear elements, the elastomer shear elements being supported by the hub.

11. The lead lag damper according to claim 10, wherein the elastomer shear elements are separated in axial direction (G) on the hub.

12. The lead lag damper according to claim 1, wherein the hub, the rotor and/or the blades are linked to the lead lag damper by interfaces which are exchangeable.

13. The lead lag damper according to claim 8, wherein the damper body defines a first elastomer shear element and a second elastomer shear element, the first and second elastomer shear elements each having a respective first side and a respective second side, wherein the first elastomer shear element is clamped with the respective first side via the non-rotating shaft to the hub and with the respective second side to the at least one control cuff of the at least one blade via a rotating bearing of the linking means, and the second elastomer shear element is clamped with the respective first side to the hub and with the respective second side to the at least one blade.

14. The lead lag damper according to claim 1, wherein the second side of the lead lag damper is linked to each of the N blades of the rotor unit and the first side is at least translationally fixed in the rotor plane.

15. The lead lag damper according to claim 1, wherein the second side of the lead lag damper is linked to each of the N blades of the rotor unit and the first side is translationally and rotationally fixed in the rotor plane.

16. The lead lag damper according to claim 1, wherein the first side of the lead lag damper is linked to each of the N blades of the rotor unit and the second side is translationally fixed in the rotor plane and rotational fixed.

17. A lead-lag damper for a rotorcraft rotor assembly, the rotor assembly having a rotor with a plurality of blades and a hub with an axis of rotation, the damper comprising:
    a generally cylindrical body extending between a first end member and a second end member, the body comprising an elastomeric material, the first end member having a center and being configured to connect to a hub with the center positioned generally along an axis of rotation, the second end member being spaced from and opposed to the first end member; and
    a link configured to connect the second end member to a plurality of blades of a rotor, wherein the second end member deflects in generally circular planar motion in response to cyclic rotor blade lead-lag motion.

18. The lead-lag damper of claim 17, wherein the first end member is a first contiguous part and the second end member is a second contiguous part.

19. The lead-lag damper of claim 17, wherein the first end member is a first plate and the second end member is a second plate.

20. A rotorcraft assembly comprising:
    a hub having an axis of rotation;
    a lead-lag damper with a generally annular body extending between a first end member and a second end member, the first end member being generally centered about the hub and secured to a non-rotating end member of the hub, the second end member being spaced from the first end member, the body comprising an elastomeric material;
    a rotor comprising a plurality of blades; and
    a bearing ring linking the second end member to each respective blade of the plurality of blades such that the second end member deflects in generally circular planar motion in response to cyclic lead-lag motion of the blades.

* * * * *